United States Patent
Mikamo et al.

(10) Patent No.: US 9,248,852 B2
(45) Date of Patent: Feb. 2, 2016

(54) ELECTRIC POWER STEERING SYSTEM

(71) Applicant: JTEKT CORPORATION, Osaka-shi, Osaka (JP)

(72) Inventors: Satoru Mikamo, Okazaki (JP); Kenichiro Aoki, Miyoshi (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 14/152,444

(22) Filed: Jan. 10, 2014

(65) Prior Publication Data

US 2014/0207335 A1 Jul. 24, 2014

(30) Foreign Application Priority Data

Jan. 18, 2013 (JP) .................................. 2013-007201

(51) Int. Cl.
*B62D 5/04* (2006.01)
(52) U.S. Cl.
CPC .............. *B62D 5/0463* (2013.01); *B62D 5/046* (2013.01); *B62D 5/0481* (2013.01)
(58) Field of Classification Search
None
See application file for complete search history.

(56) References Cited

U.S. PATENT DOCUMENTS

| | | | |
|---|---|---|---|
| 6,396,229 B1 * | 5/2002 | Sakamoto | H02P 6/18 318/400.02 |
| 8,670,904 B2 * | 3/2014 | Yoneda | B62D 5/046 180/404 |
| 2005/0001582 A1 * | 1/2005 | Goto | F02N 11/04 318/802 |
| 2009/0240389 A1 | 9/2009 | Nomura et al. | |
| 2011/0074333 A1 | 3/2011 | Suzuki | |
| 2014/0207335 A1 * | 7/2014 | Mikamo | B62D 5/046 701/41 |

FOREIGN PATENT DOCUMENTS

| | | | |
|---|---|---|---|
| EP | 2062800 A1 | | 5/2009 |
| JP | 2007261520 A | | 10/2007 |
| JP | 2008087756 A | * | 4/2008 |
| JP | A-2008-087756 | | 4/2008 |
| JP | 2009087756 A | * | 4/2009 |
| JP | 2011078230 A | * | 4/2011 |
| JP | A-2011-078230 | | 4/2011 |

OTHER PUBLICATIONS

Oct. 30, 2015 Extended European Search Report issued in European Application No. 14151241.8.

* cited by examiner

*Primary Examiner* — John R Olszewski
*Assistant Examiner* — Jean-Paul Cass
(74) *Attorney, Agent, or Firm* — Oliff PLC

(57) ABSTRACT

There is provided a drive control method for a motor including multiple sets of coils and drive circuits in an electric power steering system. In order to reduce computational load when sensorless control is executed, an electrical angle estimator includes an α-axis voltage component adder and a β-axis voltage component adder that add together voltage vectors of a first coil and a second coil expressed in a two-phase fixed coordinate system, an α-axis current component adder and a β-axis current component adder that add together current vectors of the first coil and the second coil expressed in a two-phase fixed coordinate system, and an induced voltage computing unit that computes an induced voltage based on an added voltage vector and an added current vector.

7 Claims, 11 Drawing Sheets

ELECTRIC POWER STEERING SYSTEM

INCORPORATION BY REFERENCE

The disclosure of Japanese Patent Application No. 2013-007201 filed on Jan. 18, 2013, including the specification, drawings and abstract, is incorporated herein by reference in its entirety.

BACKGROUND OF THE INVENTION

1. Field of the Invention

The invention relates to an electric power steering system that generates steering assist torque by executing drive control of an electric motor based on a driver's steering operation.

2. Description of Related Art

Conventionally, an electric power steering system detects a steering torque applied to a steering wheel by a driver, and assists a driver's steering operation by driving an electric motor according to a controlled variable set based on the detected steering torque. There is also known an electric power steering system that drives an electric motor using two drive systems that are independent of each other. For example, an electric power steering system described in Japanese Patent Application Publication No. 2011-78230 (JP 2011-78230 A) is configured such that a stator of a three-phase brushless motor has two sets of three-phase coils of two respective systems, and the two sets of three-phase coils are energized independently of each other by two respective inverters. When such a brushless motor is driven, a rotation angle sensor that detects a rotation angle of the motor is used to control the three phases. An electrical angle of the motor is derived based on the rotation angle detected by the rotation angle sensor.

When the rotation angle sensor malfunctions, it is not possible to control the phases of the brushless motor. Therefore, there is also known an electric power steering system that estimates an electrical angle based on an induced voltage (counter-electromotive force) generated at a brushless motor and executes drive control of the brushless motor using the estimated electrical angle when a rotation angle sensor malfunctions. Such control of the brushless motor executed with the use of an estimated electrical angle is called "sensorless control". This control method is described, for example, in Japanese Patent Application Publication No. 2008-87756 (JP 2008-87756 A).

However, when sensorless control is executed in an electric power steering system in which a brushless motor is driven with the use of two drive systems that are independent of each other, the computation of the induced voltage is doubled and thus the computational load on a microcomputer increases.

SUMMARY OF THE INVENTION

One object of the invention is to deal with the above-described phenomenon, that is, to reduce the computational load when sensorless control is executed in an electric power steering system that executes drive control of a motor using multiple drive systems.

In order to achieve the above-described object, an electric power steering system according to an aspect of the invention includes:

a permanent magnet synchronous motor disposed in a steering mechanism to generate steering assist torque, and including a motor stator provided with multiple sets of three-phase coils with different drive systems;

a motor drive unit that includes drive circuits provided so as to respectively correspond to the multiple sets of three-phase coils, and that energizes the multiple sets of three-phase coils independently through the respective drive circuits to drive the permanent magnet synchronous motor;

an electrical angle estimator that computes an estimated electrical angle of the permanent magnet synchronous motor; and a motor control unit that controls the drive circuits of the motor drive unit based on the estimated electrical angle computed by the electrical angle estimator to drive the permanent magnet synchronous motor.

The electrical angle estimator includes:

multiple three phase-two phase voltage vector converters each of which converts a voltage vector of voltages supplied to the three-phase coils, the voltage vector being expressed in a three-phase fixed coordinate system, into a voltage vector expressed in a two-phase fixed coordinate system, and which are provided respectively for the multiple sets of three-phase coils;

multiple three phase-two phase current vector converters each of which converts a current vector of currents passed through the three-phase coils, the current vector being expressed in a three-phase fixed coordinate system, into a current vector expressed in a two-phase fixed coordinate system, and which are provided respectively for the multiple sets of three-phase coils;

a voltage vector adder that adds together the voltage vectors of the multiple sets of three-phase coils, the voltage vectors being expressed in the two-phase fixed coordinate system;

a current vector adder that adds together the current vectors of the multiple sets of three phase coils, the voltage vectors being expressed in the two-phase fixed coordinate system; and an induced voltage computing unit that computes an induced voltage generated at the permanent magnet synchronous motor based on an added voltage vector computed by the voltage vector adder and an added current vector computed by the current vector adder.

The electrical angle estimator estimates an electrical angle of the permanent magnet synchronous motor based on the computed induced voltage.

In the electric power steering system according to the above-described aspect, the permanent magnet synchronous motor (hereinafter, referred to as "motor") is included in a steering mechanism, and a driver's steering operation is assisted by the torque generated by the motor. A typical permanent magnet synchronous motor is a three-phase brushless motor. The motor stator of the motor is provided with the multiple sets of three-phase coils driven by different drive systems, and the motor is driven by electric power supplied from the motor drive unit. The motor drive unit includes the drive circuits provided so as to respectively correspond to the multiple sets of three-phase coils, and is configured such that electric power is supplied from the respective drive circuits to the three-phase coils independently from each other. The motor control unit controls the drive circuits of the motor drive unit based on the estimated electrical angle computed by the electrical angle estimator. Thus, the motor is driven at the target controlled variable. The target controlled variable is set, for example, based on a steering torque input by the driver.

The electrical angle estimator includes the three phase-two phase voltage vector convertors, the three phase-two phase current vector convertors, the voltage vector adder, the current vector adder, and the induced voltage computing unit, and estimates an electrical angle of the motor based on the computed induced voltage.

The three phase-two phase voltage vector converters are provided respectively for the multiple sets of three-phase coils, and each converts the voltage vector of the voltages supplied to the three-phase coils, the voltage vector being expressed in the three-phase fixed coordinate system, into the voltage vector expressed in the two-phase fixed coordinate system. The three phase-two phase current vector converters are provided respectively for the multiple sets of three-phase coils, and each converts the current vector of the currents passed through the three-phase coils, the current vector being expressed in the three-phase fixed coordinate system, into the current vector expressed in the two-phase fixed coordinate system. The two-phase fixed coordinate system is a so-called $\alpha$-$\beta$ coordinate system, and obtained by converting a symmetrical three-phase coordinate system into a two-phase coordinate system that is equivalent to the three-phase coordinate system. The two-phase coordinate system is expressed by the $\alpha$-axis and the $\beta$-axis that are perpendicular to each other, and is a fixed coordinate system in which the $\alpha$-axis is arranged so as to coincide with the U-phase axis.

The voltage vector adder adds together the voltage vectors of the multiple sets of three-phase coils expressed in the two-phase fixed coordinate system. For example, when the two-phase fixed coordinate system is expressed in the $\alpha$-$\beta$ coordinate system, the voltage vector expressed by the added value of the $\alpha$-axis components of the voltage vectors and the added value of the $\beta$-axis components of the voltage vectors of the multiple sets of three-phase coils, the voltage vectors being expressed in the two-phase fixed coordinate system, is computed. The current vector adder adds together the current vectors of the multiple sets of three-phase coils expressed in the two-phase fixed coordinate system. For example, when the two-phase coordinate system is expressed in the $\alpha$-$\beta$ coordinate system, the current vector expressed by the added value of the $\alpha$-axis components of the current vectors and the added value of the $\beta$-axis components of the current vectors, the current vectors being expressed in the two-phase fixed coordinate system, is computed.

The induced voltage computing unit computes the induced voltage generated at the permanent magnet synchronous motor based on the added voltage vector computed by the voltage vector adder and the added current vector computed by the current vector adder. For example, the induced voltage vector may be computed by subtracting the voltage computed based on the added current vector, the winding resistance of the three-phase coils and the coil inductance, from the added voltage vector. In this case, differential operation of the current values, which causes a high computational load, is required to compute the voltage based on the coil inductance. When the induced voltage is computed for each of the multiple sets of three-phase coils, differential operation of the current values is required for each of the systems for the multiple sets of three-phase coils. However, in this aspect, the induced voltage is computed based on the added voltage vector obtained by adding together the voltage vectors of the multiple sets of three-phase coils expressed in the two-phase fixed coordinate system and the added current vector obtained by adding together the current vectors of the multiple sets of three-phase coils expressed in the two-phase fixed coordinate system. Therefore, it is not necessary to execute differential operation of the current value for each system. Thus, according to this aspect, it is possible to reduce computational load when the sensorless control is executed.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
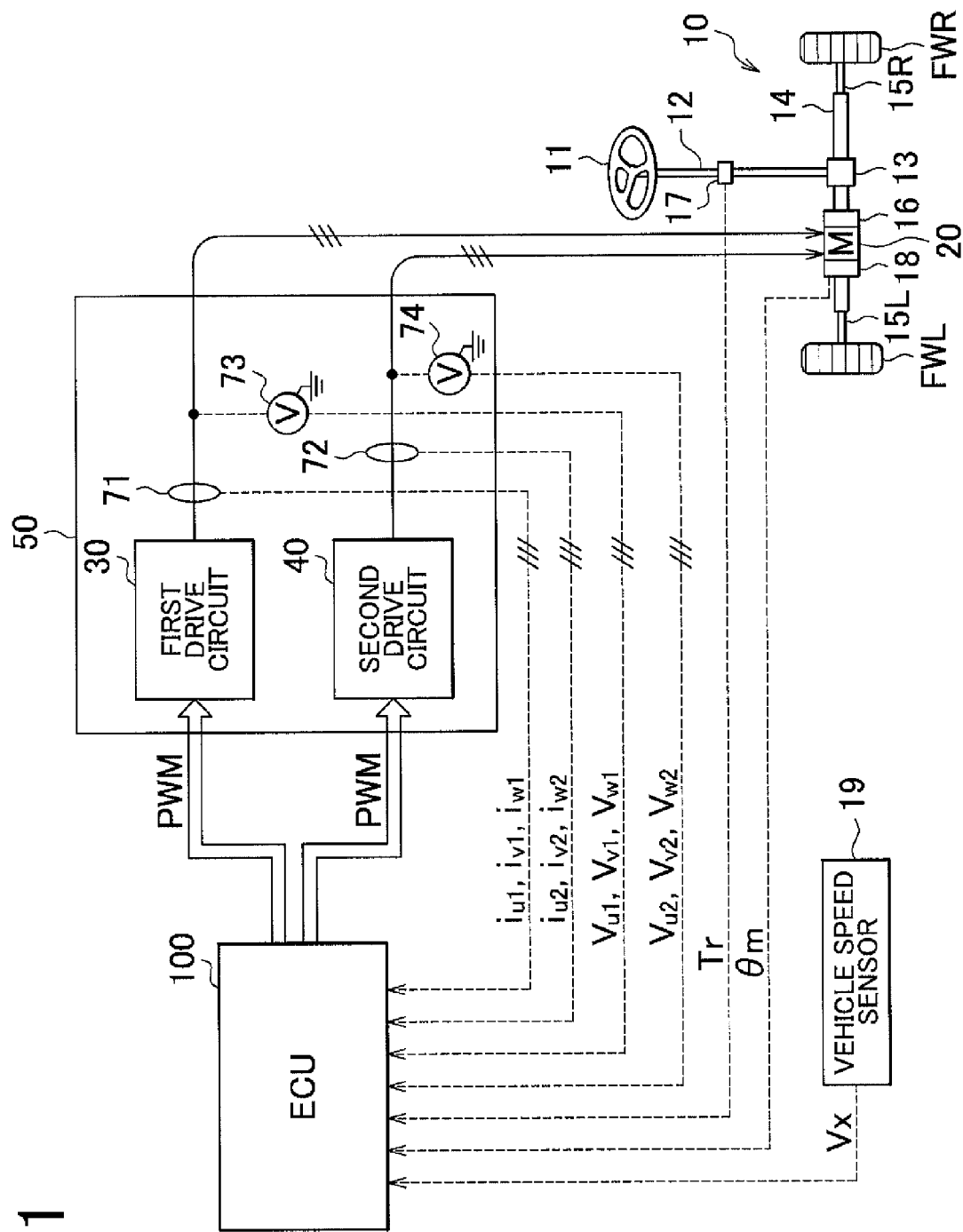
FIG. 1 is a view illustrating the schematic configuration of an electric power steering system according to an embodiment of the invention.

Hereinafter, an electric power steering system according to an embodiment of the invention will be described with reference to the accompanying drawings. FIG. 1 illustrates the schematic configuration of the electric power steering system for a vehicle according to the embodiment.

The electric power steering system includes, as main components, a steering mechanism 10 that steers steered wheels in response to a steering operation of a steering wheel 11, a motor 20 that is fitted to the steering mechanism 10 and that generates steering assist torque, a motor drive unit 50 that drives the motor 20, and an electronic control unit 100 that controls the motor drive unit 50. Hereinafter, the electronic control unit 100 will be referred to as "ECU 100".

The steering mechanism 10 is a mechanism that steers right and left front wheels FWR, FWL in response to a rotating operation of the steering wheel 11, and includes a steering shaft 12 connected at its upper end to the steering wheel 11 so as to rotate together with the steering wheel 11. A pinion gear 13 is connected to the lower end of the steering shaft 12 so as to rotate together with the steering shaft 12. The pinion gear 13 engages with rack teeth formed in a rack bar 14, and constitutes a rack-and-pinion mechanism in cooperation with the rack bar 14. Knuckles (not illustrated) of the right and left front wheels FWR, FWL are connected to the respective ends of the rack bar 14 via tie rods 15R, 15L such that the right and left front wheels FWR, FWL can be steered. The right and left front wheels FWR, FWL are steered to the right or to the left based on an axial displacement of the rack bar 14, which is caused by the rotation of the steering shaft 12 about its axis.

The motor 20 is fitted to the rack bar 14. The motor 20 is a permanent magnet synchronous motor. In the present embodiment, a three-phase brushless motor, which is a typical permanent magnet synchronous motor, is used. An output shaft of the motor 20 is connected to the rack bar 14 via a ball screw mechanism 16 such that motive power can be transmitted to the rack bar 14, and rotates to apply steering force to the right and left front wheels FWR, FWL, thereby assisting a driver's steering operation. The ball screw mechanism 16 serves as a speed reducer and a rotation-linear motion converter. The ball screw mechanism 16 reduces the speed of rotation output from the motor 20, converts the rotation into a linear motion, and transmits the linear motion to the rack bar 14.

The steering shaft 12 is provided with a torque sensor 17. The torque sensor 17 detects, for example, a torsion angle of a torsion bar (not illustrated) disposed at an intermediate portion of the steering shaft 12 with the use of a resolver or the like, and detects a steering torque Tr applied to the steering shaft 12 based on the detected torsion angle. The direction in which the steering wheel 11 is operated is identified based on whether the steering torque Tr is a positive value or a negative value. For example, the steering torque Tr when the steering wheel 11 is steered to the left is indicated by a positive value, and the steering torque Tr when the steering wheel 11 is steered to the right is indicated by a negative value. In the present embodiment, the torsion angle of the torsion bar is detected by the resolver. Alternatively, the torsion angle may be detected by another rotation angle sensor such as an encoder.

The motor 20 is provided with a rotation angle sensor 18. The rotation angle sensor 18 is embedded in the motor 20, and outputs a detection signal corresponding to a rotation angular position of a rotor of the motor 20. The rotation angle sensor 18 may be formed of, for example, a resolver. The rotation angle sensor 18 outputs a detection signal indicating a rotation angle θm of the motor 20 to the ECU 100. The ECU 100 detects an electrical angle θe of the motor 20 based on the rotation angle θm. There are two kinds of electrical angle θe of the motor 20, that is, an electrical angle detected by the rotation angle sensor 18 and an electrical angle obtained through estimation (described later). Accordingly, when the two kinds of electrical angles need to be distinguished from each other, the electrical angle detected by the rotation angle sensor 18 will be referred to as "actual electrical angle θea", and the electrical angle obtained through estimation will be referred to as "estimated electrical angle θeb". In the present embodiment, the resolver is used as the rotation angle sensor 18. Alternatively, another rotation angle sensor such as an encoder may be used.

Figure 3:
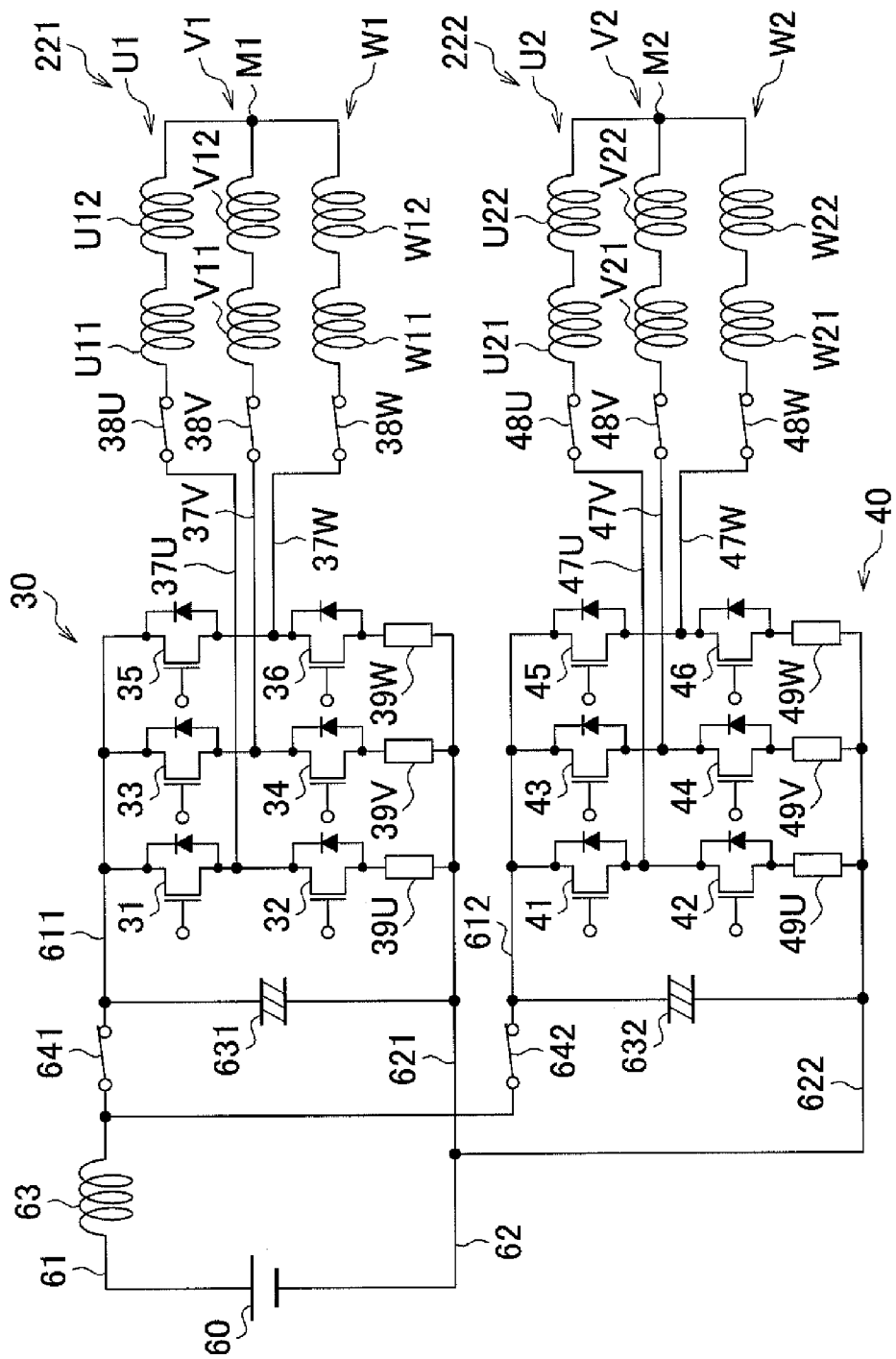
FIG. 3 is a view illustrating the configuration of a motor drive unit.
Figure 4:
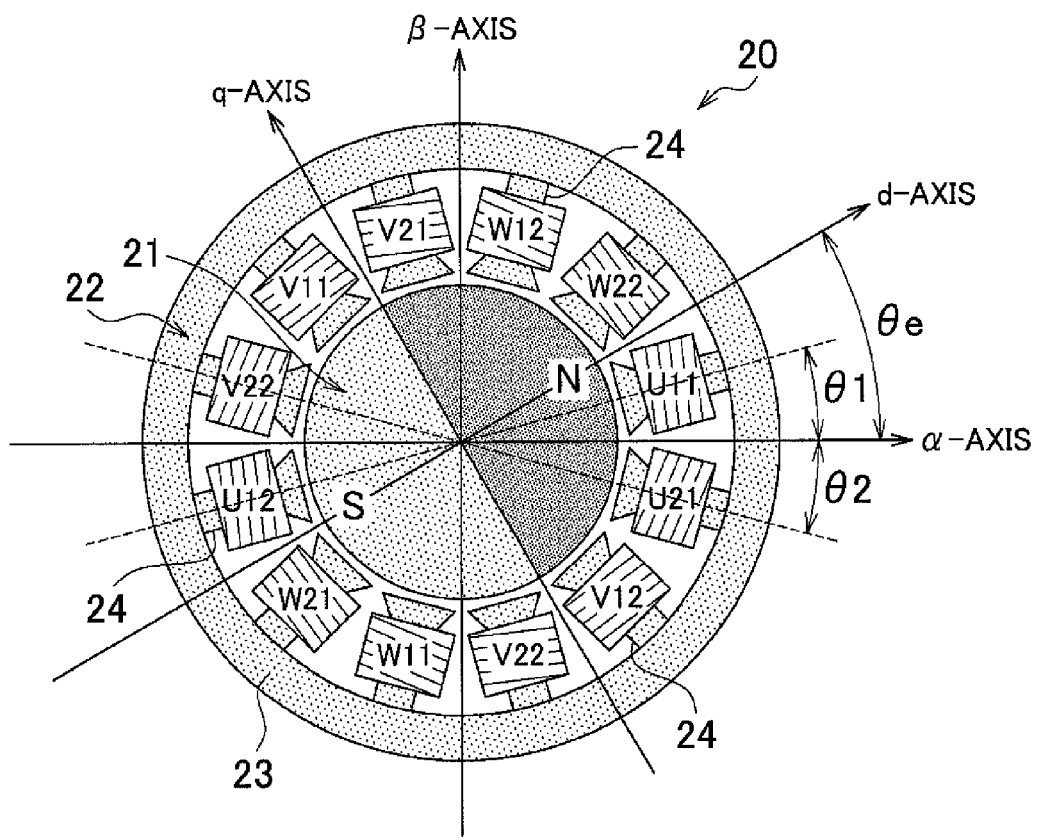
FIG. 4 is a sectional schematic view of a motor, taken along a plane perpendicular to the axis of the motor shaft, and an explanatory view illustrating the arrangement of the three-phase coils of the motor, an $\alpha$-$\beta$ coordinate system (fixed coordinate system), and a d-q coordinate system (rotating coordinate system)

As illustrated in FIG. 4, the motor 20 includes a rotor 21 having a permanent magnet, and a stator 22 having two sets of three-phase coils (a first coil 221 and a second coil 222 illustrated in FIG. 3) provided with different drive systems. As illustrated in FIG. 3, the first coil 221 includes a first U-phase coil U1, a first V-phase coil V1, and a first W-phase coil W1 that are wound around teeth 24 formed on a stator core 23. The first U-phase coil U1 is formed by connecting, in series, a U-phase coil U11 and a U-phase coil U12, which are disposed to so as to be opposed to each other across the rotor 21. The first V-phase coil V1 is disposed at a position offset by 120° from the first U-phase coil U1 in the circumferential direction, and is formed by connecting, in series, a V-phase coil V11 and a V-phase coil V12, which are disposed to so as to be opposed to each other across the rotor 21. The first W-phase coil W1 is disposed at a position offset by 120° from each of the first U-phase coil U1 and the first V-phase coil V1 in the circumferential direction, and is formed by connecting, in series, a W-phase coil W11 and a W-phase coil W12, which are disposed to so as to be opposed to each other across the rotor 21. The first U-phase coil U1, the first V-phase coil V1, and the first W-phase coil W1 are electrically connected at their one ends to each other to form a neutral point M1.

The second coil 222 includes a second U-phase coil U2, a second V-phase coil V2, and a second W-phase coil W2 that are wound around the teeth 24 formed on the stator core 23. The second U-phase coil U2 is disposed at a position offset by 30° from the first U-phase coil U1 in the circumferential direction, and is formed by connecting, in series, a U-phase coil U21 and a U-phase coil U22, which are disposed to so as to be opposed to each other across the rotor 21. The second V-phase coil V2 is disposed at a position offset by 120° from the second U-phase coil U2 in the circumferential direction, and is formed by connecting, in series, a V-phase coil V21 and a V-phase coil V22, which are disposed to so as to be opposed to each other across the rotor 21. The second W-phase coil W2 is disposed at a position offset by 120° from each of the second U-phase coil U2 and the second V-phase coil V2 in the circumferential direction, and is formed by connecting, in series, a W-phase coil W21 and a W-phase coil W22, which are disposed to so as to be opposed to each other across the rotor 21. The second U-phase coil U2, the second V-phase coil V2, and the second W-phase coil W2 are electrically connected at their one ends to each other to form a neutral point M2.

The motor drive unit 50 illustrated in FIG. 1 includes a first drive circuit 30 for energizing the first coil 221 and a second drive circuit 40 for energizing the second coil 222. The first drive circuit 30 is supplied with electric power from an in-vehicle battery 60 via a power supply line 611 and a ground line 621 illustrated in FIG. 3. The first drive circuit 30 is a three-phase inverter circuit constituted of six switching elements 31 to 36, each of which is a metal oxide semiconductor field effect transistor (MOS-FET). Specifically, a circuit formed by connecting a first switching element 31 and a second switching element 32 in series, a circuit formed by connecting a third switching element 33 and a fourth switching element 34 in series, and a circuit formed by connecting a fifth switching element 35 and a sixth switching element 36 in series are connected in parallel, a first U-phase power supply line 37U extending from a node between the two switching elements 31, 32 to the first U-phase coil U1 of the first coil 221 is provided, a first V-phase power supply line 37V extending from a node between the two switching elements 33, 34 to the first V-phase coil V1 of the first coil 221 is provided, and a first W-phase power supply line 37W extending from a node between the two switching elements 35, 36 to the first W-phase coil W1 of the first coil 221 is provided. Thus, the first drive circuit 30 is formed.

The three power supply lines 37U, 37V, 37W are provided with phase-open relays 38U, 38V, 38W, respectively, and energization of the first coil 221 is interrupted by turning off the phase-opening relay 38U, 38V, 38W, that is, by opening the contact points. In addition, shunt resistors 39U, 39V, 39W are disposed between the ground line 621 and the switching elements 32, 34, 36, respectively. Further, there is provided a first current sensor 71 that detects currents passing through respective phase coils by measuring voltage between both ends of each of the shunt resistors 39U, 39V, 39W. As illustrated in FIG. 1, the first drive circuit 30 is provided with a first voltage sensor 73 that detects potentials of the three power supply lines 37U, 37V, 37W with respect to the ground.

The first drive circuit 30 is provided with a smoothing capacitor 631 that connects the power supply line 611 and the ground line 621 to each other. The power supply line 611 is provided with a power supply relay 641.

The second drive circuit 40 is supplied with electric power from the in-vehicle battery 60 via a power supply line 612 and a ground line 622. Like the first drive circuit 30, the second drive circuit 40 is a three-phase inverter circuit constituted of six switching elements 41 to 46 each of which is a MOS-FET. The second drive circuit 40 is provided with a second U-phase power supply line 47U extending from a node between the two switching elements 41, 42 to the second U-phase coil U2 of the second coil 222, a second V-phase power supply line 47V extending from a node between the two switching elements 43, 44 to the second V-phase coil V2 of the second coil 222, and a second W-phase power supply line 47W extending from a node between the two switching elements 45, 46 to the second W-phase coil W2 of the second coil 222.

The three power supply lines 47U, 47V, 47W are provided with phase-open relays 48U, 48V, 48W, respectively, and energization of the second coil 222 is interrupted by turning off (opening) the phase-open relays 48U, 48V, 48W. In addition, shunt resistors 49U, 49V, 49W are disposed between the ground line 622 and the switching elements 42, 44, 46, respectively. Further, there is provided a second current sensor 72 that detects currents passing through respective phase coils by measuring voltage between both ends of each of the shunt resistors 49U, 49V, 49W. As illustrated in FIG. 1, the second drive circuit 40 is provided with a second voltage sensor 74 that detects potentials of the three power supply lines 47U, 47V, 47W with respect to the ground.

The second drive circuit 40 is provided with a smoothing capacitor 632 that connects the power supply line 612 and the ground line 622 to each other. The power supply line 612 is provided with a power supply relay 642.

A main power supply line 61 is connected to the cathode of the in-vehicle battery 60, and the main power supply line 61 is branched out into the first power supply line 611 and the second power supply line 612. A main ground line 62 is connected to the anode of the in-vehicle battery 60, and the main ground line 62 is branched out into the first ground line 621 and the second ground line 622. The main power supply line 61 is provided with a smoothing coil 63.

The values detected by the first voltage sensor 73 and the second voltage sensor 74 are output to the ECU 100. The voltages detected by the first voltage sensor 73 and the second voltage sensor 74 each are three-phase voltages (terminal voltages) that are supplied to the first coil 221 and the second coil 222. However, because the voltage between both ends of each phase coil is required to compute an induced voltage (described later), the ECU 100 computes the voltage between both ends of each phase coil based on the detected terminal voltages of the coils. The voltage between both ends of each phase coil means, for example, a voltage $v_{u1}$ between both ends of the first U-phase coil U1, a voltage $v_{v1}$ between both ends of the first V-phase coil V1, and a voltage $v_{w1}$ between both ends of the first W-phase coil W1 in the first coil 221. The voltage between both ends of each phase coil means a voltage $v_{u2}$ between both ends of the second U-phase coil U2, a voltage $v_{v2}$ between both ends of the second V-phase coil V2, and a voltage $v_{w2}$ between both ends of the second W-phase coil W2 in the second coil 222. Hereinafter, the voltages $v_{u1}$, $v_{v1}$, $v_{w1}$, $v_{u2}$, $v_{v2}$, $v_{w2}$ between both ends of the respective phase coils will be referred to as "coil voltages $v_{u1}$, $v_{v1}$, $v_{w1}$, $v_{u2}$, $v_{v2}$, $v_{w2}$", respectively.

The coil voltages $v_{u1}$, $v_{v1}$, $v_{w1}$ are obtained by computing the differences between the voltage at the neutral point M1 of the first coil 221 and the respective terminal voltages of the first coil 221, that is, the respective values detected by the first voltage sensor 73. The voltage at the neutral point M1 is computed by dividing the total sum of the terminal voltages of the first coil 221 by three. Similarly, the coil voltages $v_{u2}$, $v_{v2}$, $v_{w2}$ are obtained by computing the differences between the voltage at the neutral point M2 of the second coil 222 and the respective terminal voltages of the second coil 222, that is, the respective values detected by the second voltage sensor 74. The voltage at the neutral point M2 is computed by dividing the total sum of the terminal voltages of the second coil 222 by three. Such computations are actually executed by the ECU 100, but description will be provided on the assumption that the values detected by the first voltage sensor 73 and the second voltage sensor 74 are used as the coil voltages $v_{u1}$, $v_{v1}$, $v_{w1}$ and the coil voltages $v_{u2}$, $v_{v2}$, $v_{w2}$.

The current, which is detected by the first current sensor 71 illustrated in FIG. 1 and which passes through the first U-phase coil U1 of the first coil 221, will be referred to as "coil current $i_{u1}$", the current, which is detected by the first current sensor 71 and which passes through the first V-phase coil V1, will be referred to as "coil current $i_{v1}$", and the current, which is detected by the first current sensor 71 and which passes through the first W-phase coil W1, will be referred to as "coil current $i_{w1}$". Similarly, the current, which is detected by the second current sensor 72 and which passes through the second U-phase coil U2 of the second coil 222, will be referred to as "coil current $i_{u2}$", the current, which is detected by the second current sensor 72 and which passes through the second V-phase coil V2, will be referred to as "coil current $i_{v2}$", and the current, which is detected by the second current sensor 72 and which passes through the second W-phase coil W2, will be referred to as "coil current $i_{w2}$".

Figure 5:
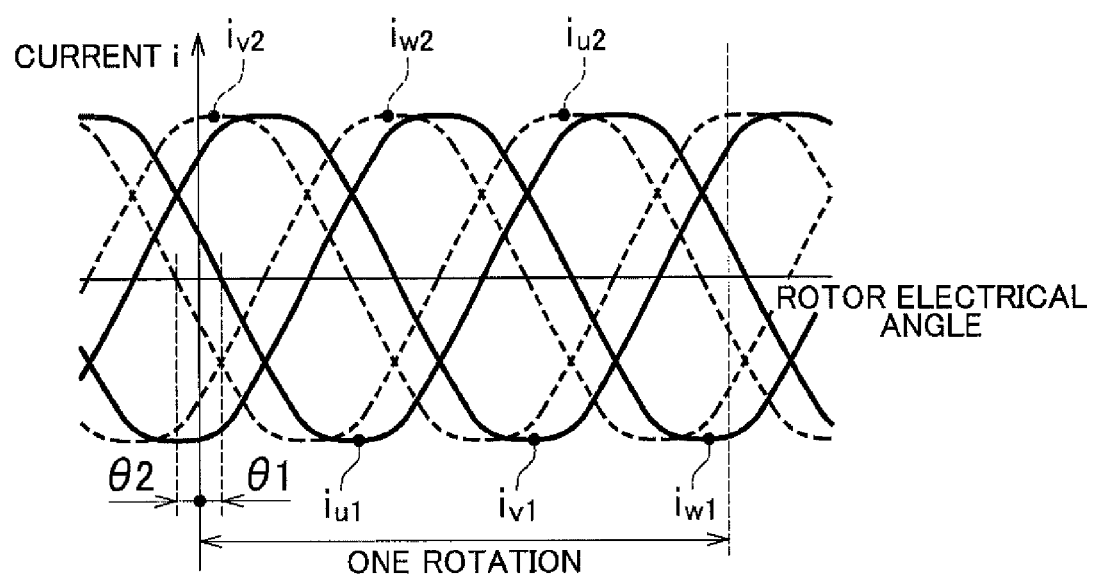
FIG. 5 is a waveform chart illustrating three-phase currents that are passed through two sets of coils.

The gates of the switching elements 31 to 36 of the first drive circuit 30 and the gates of the switching elements 41 to 46 of the second drive circuit 40 are connected to the ECU 100, and the duty ratios of the switching elements 31 to 36 and 41 to 46 are controlled according to PWM control signals output from the ECU 100. Thus, the drive voltage for the motor 20 is adjusted to a target voltage. The motor 20 includes two coils 221, 222, and the coils 221, 222 are respectively energized by the drive circuits 30, 40 that are independent of each other. That is, the electric power steering system according to the present embodiment is configured such that the motor 20 is driven by two drive systems that are independent of each other. Therefore, the ECU 100 generates PWM control signals to cause the motor 20 to output a target assist torque with the two coils 221, 222 energized. In this case, as illustrated in FIG. 4, because two sets of coils, that is, the first coil 221 and the second coil 222 are disposed such that the adjacent coils are offset from each other by 30° in the circumferential direction of the stator 22, the intermediate position between the U-phase coil U11 and the U-phase coil U21 is defined as an origin (an α-axis which is described later) of an electrical angle, the angle between the direction of the U-phase coil U11 and the α-axis is defined as an offset angle θ1, and the angle between the direction of the U-phase coil U21 and the α-axis is defined as an offset angle θ2. As illustrated in FIG. 5, the phases of the currents passing through the first coil 221 and the second coil 222 are adjusted by the offset angle θ1 and the offset angle θ2, respectively.

The ECU 100 includes, as a main component, a microcomputer including, for example, a CPU, a ROM, and a RAM. As illustrated in FIG. 1, the ECU 100 is connected to the torque sensor 17, the rotation angle sensor 18, the current sensors 71, 72, the voltage sensors 73, 74, and a vehicle speed sensor 19 that detects a vehicle speed, and receives, as inputs, the detection signals indicating the steering torque Tr, the rotation angle θm, the coil currents $i_{u1}$, $i_{v1}$, $i_{w1}$, $i_{u2}$, $i_{v2}$, $i_{w2}$, the coil voltages $v_{u1}$, $v_{v1}$, $v_{w1}$, $v_{u2}$, $v_{v2}$, $v_{w2}$, and the vehicle speed Vx. The ECU 100 computes command currents that should be passed through the coils 221, 222 of the motor 20 to obtain optimal steering assist torque (hereinafter, simply referred to as "assist torque") corresponding to a driver's steering operation based on the received detection signals, and controls the duty ratios of the switching elements 31 to 36 of the drive circuit 30 and the switching elements 41 to 46 of the drive circuit 40 to pass the command currents to the coils 221, 222. The ECU 100 is connected to the two power supply relays 641, 642, and controls the states of power supply to the drive circuits 30, 40 by transmitting switching control signals to the power supply relays 641, 642 (see FIG. 3). The EPU 100 is connected to the six phase-open relays 38U, 38V, 38W, 48U, 48V, 48W, and individually open and close the power supply paths to the coils U1, V1, W1, U2, V2, W2 by transmitting switching control signals to the phase-opening relays 38U, 38V, 38W, 48U, 48V, 48W, respectively.

Next, control on the motor 20 executed by the ECU 100 will be described. As illustrated in FIG. 4, the direction through which a magnetic field of the permanent magnet disposed in the rotor 21 of the motor 20 penetrates (direction in which the north pole of the permanent magnet faces) is defined as a d-axis, and the direction perpendicular to the d-axis (in other words, direction of which the electrical angle is advanced by π/2 (rad) with respect to that of the d-axis) is defined as a q-axis, a d-q coordinate system is defined. Because the d-q coordinate system rotates with the rotation of the rotor 21 of the motor 20, the d-q coordinate system is a two-phase rotating coordinate system. The ECU 100 controls the rotation of the motor 20 by executing current vector control using a d-q coordinate system.

The electrical angle θe is expressed by an angle formed between the d-axis and the axis penetrating through the U-phase coils of the motor 20. In the example illustrated in FIG. 4, because the two sets of coils, that is, the first coil 221 and the second coil 222 are disposed such that adjacent coils are offset by 30° in the circumferential direction of the stator 22, the intermediate position between U-phase coils U1, U2 is set as the U-phase axis. The U-phase axis coincides with the α-axis of an α-β coordinate system that is a two-phase fixed coordinate system fixed to the stator 22 (described later).

A d-axis component of the current vector in the d-q coordinate system will be referred to as "d-axis current", and a q-axis component of the current vector in the d-q coordinate system will be referred to as "q-axis current". The q-axis current acts so as to generate a magnetic field in the q-axis direction. Therefore, the q-axis current generates motor torque. On the other hand, the d-axis current generates a magnetic field in the d-axis direction. Therefore, the d-axis current does not generate motor torque and is used for field-weakening control. In order to obtain maximum motor torque efficiency, the ECU 100 controls the current phases such that the current vector moves on the q-axis and the d-axis current becomes zero.

In order to execute the current vector control, the ECU 100 determines the d-q coordinate axes by detecting the electrical angle θe. The electrical angle θe is obtained based on a rotation angle signal detected by the rotation angle sensor 18, but the electrical angle θe cannot be obtained when the rotation angle sensor 18 malfunctions. Therefore, when the rotation angle sensor 18 malfunctions, the ECU 100 computes an estimated electrical angle θeb through processes (described later), and executes the current vector control using the estimated electrical angle θeb. The motor control executed with the use of the estimated electrical angle θeb will be referred to as "sensorless control".

Figure 2:
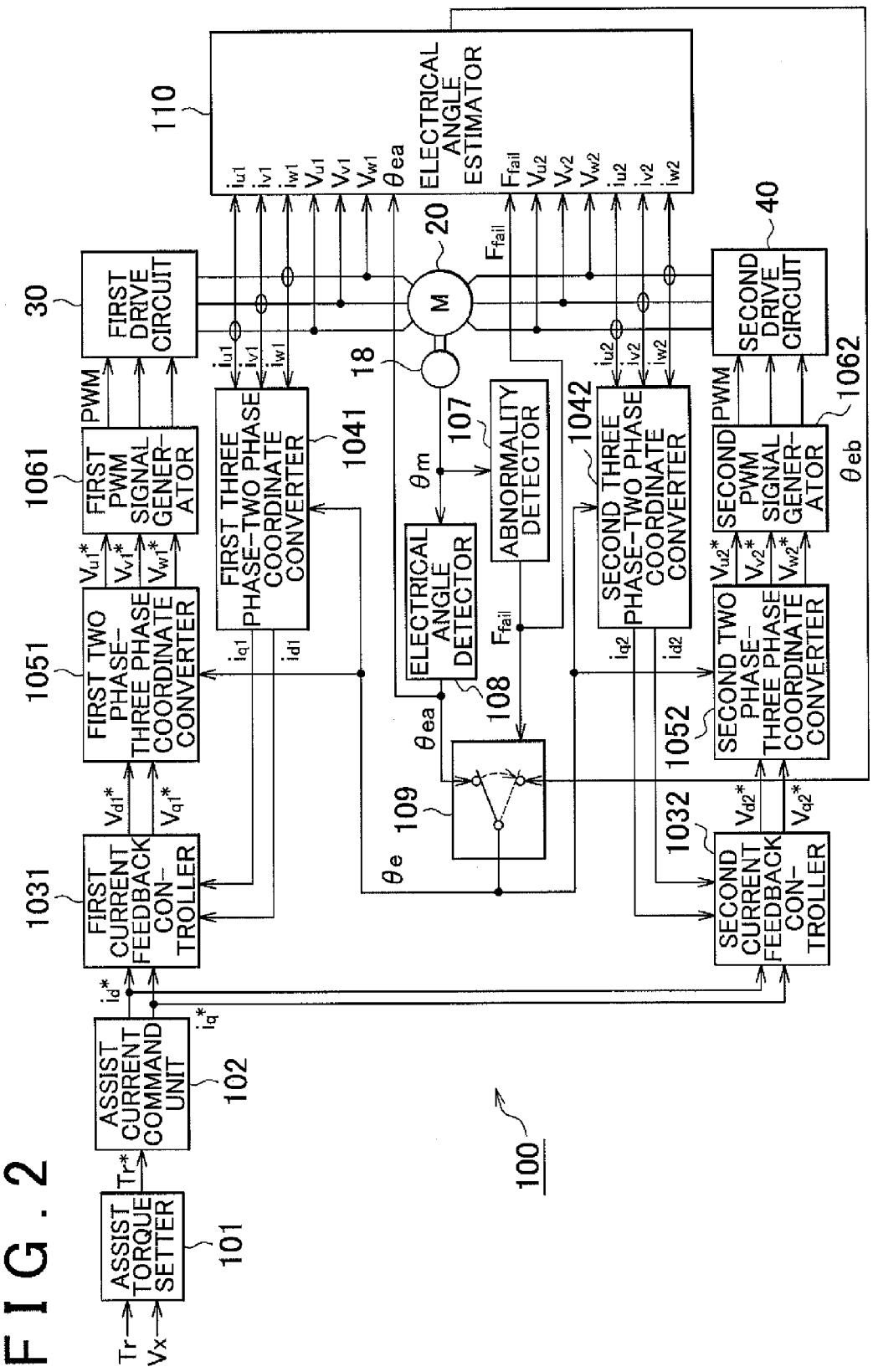
FIG. 2 is a functional block diagram illustrating a process executed by a microcomputer of an ECU.
Figure 6:
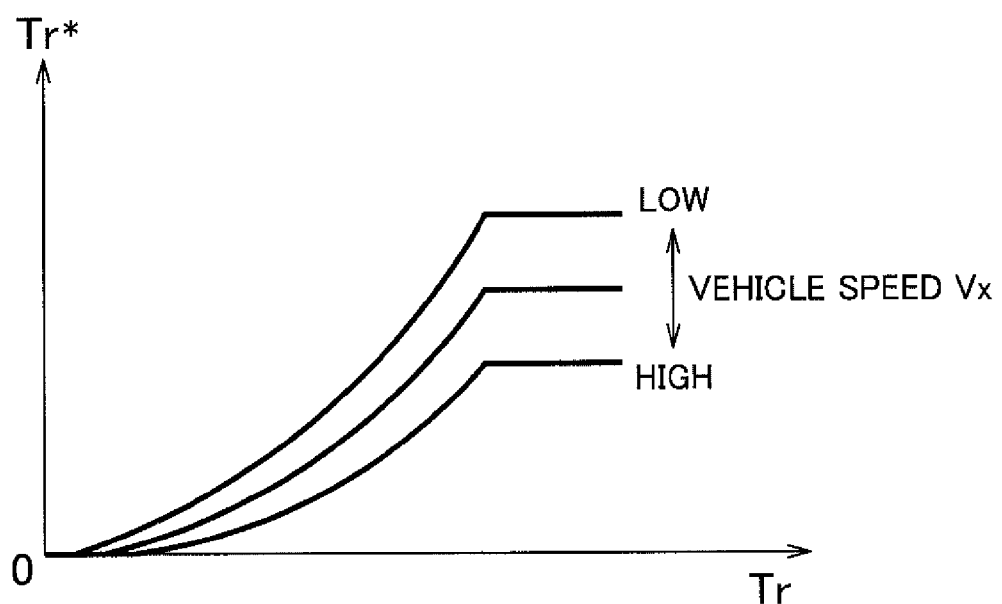
FIG. 6 is a graph illustrating an assist map.

Next, the functions of the ECU 100 will be described with reference to FIG. 2. FIG. 2 is a functional block diagram illustrating the functions achieved through program control executed by the microcomputer of the ECU 100. The functional units repeat the processes with a prescribed short computation period. The ECU 100 includes an assist torque setter 101. The assist torque setter 101 stores an assist map illustrated in FIG. 6. The assist map is correlated data in which the correlation between the steering torque Tr and the target assist torque Tr* is set for each of multiple typical vehicle speeds Vx. The assist torque setter 101 receives, as inputs, the vehicle speed Vx detected by the vehicle speed sensor 19 and the steering torque Tr detected by the torque sensor 17, and computes the target assist torque Tr* based on the vehicle speed Vx and the steering torque Tr with reference to the assist map. FIG. 6 illustrates an assist map used for steering to the left. In an assist map used for steering to the right, the signs of the steering torque Tr and the target assist torque Tr* are opposite from those in the assist map used for steering to the left, that is, the signs of the steering torque Tr and the target assist torque Tr* are negative.

The assist torque setter 101 outputs the computed target assist torque Tr* to an assist current command unit 102. The assist current command unit 102 computes a q-axis command current $i_q$* in the d-q coordinate system by dividing the target assist torque Tr* by a torque constant. The assist current command unit 102 sets a d-axis command current $i_d$* to zero (id*=0). When the field-weakening control is executed, the d-axis command current $i_d$* is set to a value other than zero. However, because the invention is not characterized by the field-weakening control, description will be provided on the assumption that the d-axis command current $i_d$* is zero.

The thus computed q-axis command current $i_q$* and the d-axis command current $i_d$* are distributed at a prescribed ratio, for example, 1:1, and are output to a first current feedback controller 1031 and a second current feedback controller 1032. For example, a half of the q-axis command current $i_q$* and a half of the d-axis command current $i_d$* are output to the first current feedback controller 1031, and the remaining half of the q-axis command current $i_q$* and the remaining half of the d-axis command current $i_d$* are output to the second current feedback controller 1032. In the following description, the q-axis command current $i_q$* and the distributed d-axis command current $i_d$* that are distributed to each of the first current feedback controller 1031 and the second current feedback controller 1032 will be expressed as a q-axis command current $i_q$* and a d-axis command current $i_d$*, respectively. The first current feedback controller 1031 computes a deviation $\Delta i_{q1}$ by subtracting the q-axis actual current $i_{q1}$ from the q-axis command current $i_q$*, and computes a q-axis command voltage $v_{q1}$* such that the q-axis actual current $i_{q1}$ follows the q-axis command current $i_q$* under proportional-integral control executed with the use of the deviation $\Delta i_{q1}$. Similarly, the first current feedback controller 1031 computes a deviation $\Delta i_{d1}$ by subtracting the d-axis actual current $i_{d1}$ from the d-axis command current $i_d$* and computes a d-axis command voltage $v_{d1}$* such that the d-axis actual current $i_{d1}$ follows the d-axis command current $i_d$* under proportional-integral control executed with the use of the deviation $\Delta i_{d1}$.

The q-axis actual current $i_{q1}$ and the d-axis actual current $i_{d1}$ are obtained by converting the detected values $i_{u1}$, $i_{v1}$, $i_{w1}$ of three-phase currents actually passed through the first coil 221 of the motor 20 into two-phase currents in the d-q coordinate system. The conversion of the three-phase currents $i_{u1}$, $i_{v1}$, $i_{w1}$ into the two-phase currents $i_{d1}$, $i_{q1}$ in the d-q coordinate system is executed by a first three phase-two phase coordinate converter 1041. The first three phase-two phase coordinate converter 1041 receives, as an input, the electrical angle θe output from an electrical angle selector 109 (described later), and converts the three-phase currents $i_{u1}$, $i_{v1}$, $i_{w1}$ detected by the first current sensor 71 into the two-phase currents $i_{d1}$, $i_{q1}$ in the d-q coordinate system based on the received electrical angle θe.

A conversion matrix C for converting the three-phase coordinate system into the d-q coordinate system is expressed by Expression (1).

$$C = \sqrt{\frac{2}{3}} \begin{bmatrix} \cos\theta e & \cos(\theta e - \frac{2}{3}\pi) & \cos(\theta e + \frac{2}{3}\pi) \\ -\sin\theta e & -\sin(\theta e - \frac{2}{3}\pi) & -\sin(\theta e + \frac{2}{3}\pi) \end{bmatrix} \quad (1)$$

As will be described later, the electrical angle selector 109 outputs the actual electrical angle θea of the motor 20 as the electrical angle θe when an abnormality of the rotation angle sensor 18 is not detected, and outputs the estimated electrical angle θeb of the motor 20 as the electrical angle θe when an abnormality of the rotation angle sensor 18 is detected.

The q-axis command voltage $v_{q1}^*$ and the d-axis command voltage $v_{d1}^*$ computed by the first current feedback controller 1031 are output to a first two phase-three phase coordinate converter 1051. The first two phase-three phase coordinate converter 1051 converts the q-axis command voltage $v_{q1}^*$ and the d-axis command voltage $v_{d1}^*$ into three-phase command voltages $v_{u1}^*$, $v_{v1}^*$, $v_{w1}^*$ based on the electrical angle θe output from the electrical angle selector 109, and outputs the obtained three-phase command voltages $v_{u1}^*$, $v_{v1}^*$, $v_{w1}^*$ to a first PWM signal generator 1061. The first PWM signal generator 1061 outputs PWM control signals corresponding to the three-phase command voltages $v_{u1}^*$, $v_{v1}^*$, $v_{w1}^*$ to the switching elements 31 to 36 of the first drive circuit 30. Thus, three-phase currents pass through the first coil 221 of the motor 20.

The second current feedback controller 1032 computes a deviation $\Delta i_{q2}$ by subtracting the q-axis actual current $i_{q2}$ from the q-axis command current $i_q^*$, and computes a q-axis command voltage $v_{q2}^*$ such that the q-axis actual current $i_{q2}$ follows the q-axis command current $i_q^*$ under proportional-integral control executed with the use of the deviation $\Delta i_{q2}$. Similarly, the second current feedback controller 1032 computes a deviation $\Delta i_{d2}$ by subtracting the d-axis actual current $i_{d2}$ from the d-axis command current $i_d^*$, and computes a d-axis command voltage $v_{d2}^*$ such that the d-axis actual current $i_{d2}$ follows the d-axis command current $i_d^*$ under proportional-integral control executed with the use of the deviation $\Delta i_{d2}$.

The q-axis actual current $i_{q2}$ and the d-axis actual current $i_{d2}$ are obtained by converting the detected values $i_{u2}$, $i_{v2}$, $i_{w2}$ of three-phase currents actually passed through the second coil 222 of the motor 20 into two-phase currents in the d-q coordinate system. The conversion of the three-phase currents $i_{u2}$, $i_{v2}$, $i_{w2}$ into the two-phase currents $i_{d2}$, $i_{q2}$ in the d-q coordinate system is executed by a second three phase-two phase coordinate converter 1042. The second three phase-two phase coordinate converter 1042 receives, as an input, the electrical angle θe output from the electrical angle selector 109, and converts the three-phase currents $i_{u2}$, $i_{v2}$, $i_{w2}$ detected by the second current sensor 72 into the two-phase currents $i_{d2}$, $i_{q2}$ in the d-q coordinate system based on the received electrical angle θe.

The q-axis command voltage $v_{q2}^*$ and the d-axis command voltage $v_{d2}^*$ computed by the second current feedback controller 1032 are output to a second two phase-three phase coordinate converter 1052. The second two phase-three phase coordinate converter 1052 converts the q-axis command voltage $v_{q2}^*$ and the d-axis command voltage $v_{d2}^*$ into three-phase command voltages $v_{u2}^*$, $v_{v2}^*$, $v_{w2}^*$ based on the electrical angle θe output from the electrical angle selector 109, and outputs the obtained three-phase command voltages $v_{u2}^*$, $v_{v2}^*$, $v_{w2}^*$ to a second PWM signal generator 1062. The second PWM signal generator 1062 outputs PWM control signals corresponding to the three-phase command voltages $v_{u2}^*$, $v_{v2}^*$, $v_{w2}^*$ to the switching elements 41 to 46 of the second drive circuit 40. Thus, three-phase currents pass through the second coil 222 of the motor 20.

The motor 20 is driven by energizing the two coils 221, 222, and an assist torque that follows the target assist torque Tr* is applied to the steering mechanism 10.

A rotation angle detection signal output from the rotation angle sensor 18 is output to the electrical angle detector 108 and the abnormality detector 107. The electrical angle detector 108 computes the actual electrical angle θea of the motor 20 based on the rotation angle detection signal output from the rotation angle sensor 18, and outputs the computed actual electrical angle θea to the electrical angle selector 109. The actual electrical angle θea is unambiguously determined based on the rotation angle θm of the motor 20 and the number of pole pairs.

The abnormality detector 107 detects an abnormality of the rotation angle sensor 18 based on the rotation angle detection signal output from the rotation angle sensor 18. When a resolver is employed as the rotation angle sensor 18, breaking or an insulation failure may occur in detection coils in the resolver, that is, a sine phase detection coil and a cosine phase detection coil, and an excitation coil. Therefore, the abnormality detector 107 monitors the amplitude of the output signal of each detection coil and determines that an abnormality has occurred in the sensor when the amplitude falls outside a prescribed allowable range. Because a pair of detection coils is provided such that output signals are offset by π/2 from each other, an abnormality may be detected by comparing two output signals with each other. When the combination of the two output signals is contradictory, for example, when a constant value signal is output from a second-phase detection coil while a sinusoidal signal is output from a first-phase detection coil, it is determined that an abnormality has occurred in the rotation angle sensor 18. The abnormality detector 107 determines the presence or absence of an abnormality of the rotation angle sensor 18 in this way, and outputs a sensor abnormality determination signal $F_{fail}$ indicating the presence or absence of an abnormality. The abnormality detector 107 sets the sensor abnormality determination signal $F_{fail}$ to one when it is determined that there is an abnormality, and sets the sensor abnormality determination signal $F_{fail}$ to zero when it is determined that there is no abnormality.

When an abnormality has occurred in the rotation angle sensor 18, the electrical angle of the motor 20 cannot be detected and thus the motor 20 cannot be driven under the current vector control. Therefore, the ECU 100 is provided with an electrical angle estimator 110 that estimates the electrical angle so as to continue the rotation control on the motor 20 even when an abnormality has occurred in the rotation angle sensor 18.

Figure 7:
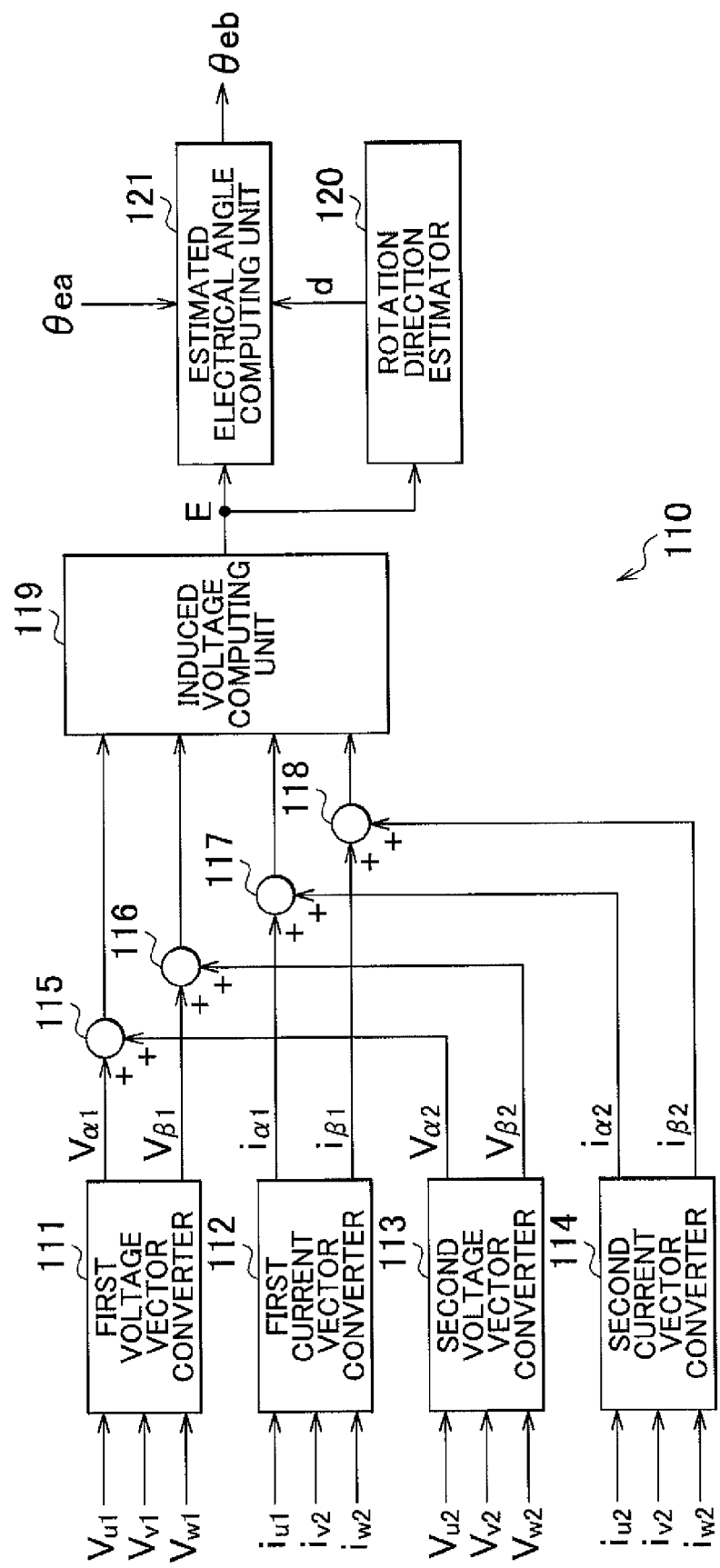
FIG. 7 is a functional block diagram of an electrical angle estimator.

The electrical angle estimator 110 starts operating upon reception of the sensor abnormality determination signal $F_{fail}$ set to one ($F_{fail}$=1). FIG. 7 illustrates a schematic diagram of the electrical angle estimator 110. As functions implemented under program control, the electrical angle estimator 110 includes a first voltage vector converter 111, a first current vector converter 112, a second voltage vector converter 113, a second current vector converter 114, an α-axis voltage component adder 115, a β-axis voltage component adder 116, an α-axis current component adder 117, a β-axis current component adder 118, an induced voltage computing unit 119, a rotation direction estimator 120, and an estimated electrical angle computing unit 121.

Figure 8:
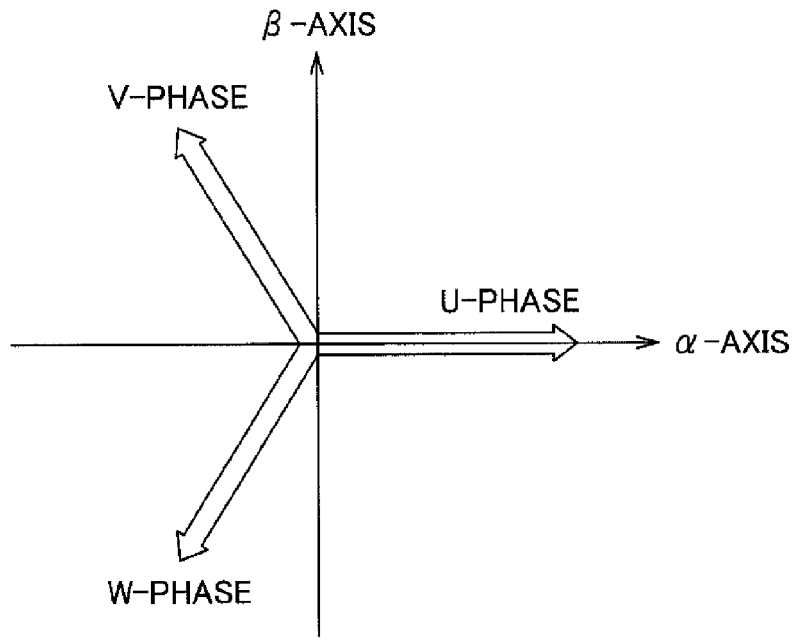
FIG. 8 is an explanatory view illustrating the correlation between a three-phase fixed coordinate system and a two-phase fixed coordinate system.

The first voltage vector converter 111, the first current vector converter 112, the second voltage vector converter 113, and the second current vector converter 114 are functional units that convert the voltage vector or the current vector expressed in a three-phase fixed coordinate system into the voltage vector or the current vector expressed in a two-phase fixed coordinate system equivalent to the voltage vector or the current vector expressed in the three-phase fixed coordinate system. As illustrated in FIG. 8, the three-phase fixed coordinate system is used to express the motor voltage or the motor current using planar coordinates including a U-phase axis, a V-phase axis, and a W-phase axis that are offset by 120° from each other. On the other hand, the two-phase fixed coordinate system is used to express the motor voltage or the motor current using planar coordinates including an α-axis that coincides with the U-phase axis and a β-axis perpendicular to the α-axis. The three-phase fixed coordinate system and the two-phase fixed coordinate system are expressed as coordinates fixed to the stator of the motor.

On the other hand, the above-described two-phase rotating coordinate system (d-q coordinate system) is a rotating coordinate system of which the coordinate axes rotate with the rotation of the rotor of the motor. Because the motor 20 according to the present embodiment includes the coils 221, 222 with two different drive systems, and the two sets of coils, that is, the first coil 221 and the second coil 222 are disposed such that adjacent coils are offset by 30° in the circumferential direction of the stator 22 as illustrated in FIG. 4, the intermediate position between the U-phase coils U1, U2 of the first and second coils 221, 222 is set as the α-axis. Accordingly, the offset angle θ1, which is an angle formed between the α-axis in the two-phase fixed coordinate system and the U-phase axis of the first coil 221, and the offset angle θ2, which is an angle formed between the α-axis in the two-phase fixed coordinate system and the U-phase axis of the second coil 222, are used in the following expressions.

The first voltage vector converter 111 converts three-phase coil voltages $v_{u1}$, $v_{v1}$, $v_{w1}$ into two-phase coil voltages $v_{\alpha1}$, $v_{\beta1}$ expressed in the two-phase fixed coordinate system according to Expression (2).

$$\begin{bmatrix} v_{\alpha1} \\ v_{\beta1} \end{bmatrix} = \sqrt{\frac{2}{3}} \cdot \begin{bmatrix} \cos(-\theta_1) & \cos\left(-\frac{2\pi}{3} - \theta_1\right) & \cos\left(-\frac{4\pi}{3} - \theta_1\right) \\ -\sin(-\theta_1) & -\sin\left(-\frac{2\pi}{3} - \theta_1\right) & -\sin\left(-\frac{4\pi}{3} - \theta_1\right) \end{bmatrix} \begin{bmatrix} v_{u1} \\ v_{v1} \\ v_{w1} \end{bmatrix} \quad (2)$$

The first voltage vector converter 111 outputs the computed two-phase coil voltage $v_{\alpha1}$ to the α-axis voltage component adder 115, and outputs the computed two-phase coil voltage $v_{\beta1}$ to the β-axis voltage component adder 116.

The first current vector converter 112 converts the three-phase coil currents $i_{u1}$, $i_{v1}$, $i_{w1}$ into two-phase coil currents $i_{\alpha1}$, $i_{\beta1}$ expressed in the two-phase fixed coordinate system according to Expression (3).

$$\begin{bmatrix} i_{\alpha1} \\ i_{\beta1} \end{bmatrix} = \sqrt{\frac{2}{3}} \cdot \begin{bmatrix} \cos(-\theta_1) & \cos\left(-\frac{2\pi}{3} - \theta_1\right) & \cos\left(-\frac{4\pi}{3} - \theta_1\right) \\ -\sin(-\theta_1) & -\sin\left(-\frac{2\pi}{3} - \theta_1\right) & -\sin\left(-\frac{4\pi}{3} - \theta_1\right) \end{bmatrix} \begin{bmatrix} i_{u1} \\ i_{v1} \\ i_{w1} \end{bmatrix} \quad (3)$$

The first current vector converter 112 outputs the computed two-phase coil current $i_{\alpha1}$ to the α-axis current component adder 117, and outputs the computed two-phase coil current $i_{\beta1}$ to the β-axis current component adder 118.

The second voltage vector converter 113 converts the three-phase coil voltages $v_{u2}$, $v_{v2}$, $v_{w2}$ into the two-phase coil voltages $v_{\alpha2}$, $v_{\beta2}$ expressed in the two-phase fixed coordinate system according to Expression (4).

$$\begin{bmatrix} v_{\alpha2} \\ v_{\beta2} \end{bmatrix} = \sqrt{\frac{2}{3}} \cdot \begin{bmatrix} \cos(-\theta_2) & \cos\left(-\frac{2\pi}{3} - \theta_2\right) & \cos\left(-\frac{4\pi}{3} - \theta_2\right) \\ -\sin(-\theta_2) & -\sin\left(-\frac{2\pi}{3} - \theta_2\right) & -\sin\left(-\frac{4\pi}{3} - \theta_2\right) \end{bmatrix} \begin{bmatrix} v_{u2} \\ v_{v2} \\ v_{w2} \end{bmatrix} \quad (4)$$

The second voltage vector converter 113 outputs the computed two-phase coil voltage $v_{\alpha2}$ to the α-axis voltage component adder 115, and outputs the computed two-phase coil voltage $v_{\beta2}$ to the β-axis voltage component adder 116.

The second current vector converter 114 converts the three-phase coil currents $i_{u2}$, $i_{v2}$, $i_{w2}$ into the two-phase coil currents $i_{\alpha2}$, $i_{\beta2}$ expressed in the two-phase fixed coordinate system according to Expression (5).

$$\begin{bmatrix} i_{\alpha2} \\ i_{\beta2} \end{bmatrix} = \sqrt{\frac{2}{3}} \cdot \begin{bmatrix} \cos(-\theta_2) & \cos\left(-\frac{2\pi}{3} - \theta_2\right) & \cos\left(-\frac{4\pi}{3} - \theta_2\right) \\ -\sin(-\theta_2) & -\sin\left(-\frac{2\pi}{3} - \theta_2\right) & -\sin\left(-\frac{4\pi}{3} - \theta_2\right) \end{bmatrix} \begin{bmatrix} i_{u2} \\ i_{v2} \\ i_{w2} \end{bmatrix} \quad (5)$$

The second current vector converter 114 outputs the computed two-phase coil current $i_{\alpha2}$ to the α-axis current component adder 117, and outputs the computed two-phase coil current $i_{\beta2}$ to the β-axis current component adder 118.

The α-axis voltage component adder 115 adds the two-phase coil voltage $v_{\alpha1}$ and the two-phase coil voltage $v_{\alpha2}$ together, and outputs the computation result to the induced voltage computing unit 119. The β-axis voltage component adder 116 adds the two-phase coil voltage $v_{\beta1}$ and the two-phase coil voltage $v_{\beta2}$ together, and outputs the computation result to the induced voltage computing unit 119. The α-axis current component adder 117 adds the two-phase coil current $i_{\alpha1}$ and the two-phase coil current $i_{\alpha2}$ together, and outputs the computation result to the induced voltage computing unit 119. The β-axis current component adder 118 adds the two-phase coil current $i_{\beta1}$ and the two-phase coil current $i_{\beta2}$ together, and outputs the computation result to the induced voltage computing unit 119.

The voltage vector ($v_{\alpha1}$, $v_{\beta1}$) of the first coil 221 and the voltage vector ($v_{\alpha2}$, $v_{\beta2}$) of the second coil 222 expressed in the two-phase fixed coordinate system are added together by the α-axis voltage component adder 115 and the β-axis voltage component adder 116. The current vector ($i_{\alpha1}$, $i_{\beta1}$) of the first coil 221 and the current vector ($i_{\alpha2}$, $i_{\beta2}$) of the second coil 222 expressed in the two-phase fixed coordinate system are added together by the α-axis current component adder 117 and the β-axis current component adder 118.

The induced voltage computing unit 119 computes the induced voltage vector E($e_\alpha$, $e_\beta$) generated at the motor 20 according to Expression (6).

$$\begin{bmatrix} e_\alpha \\ e_\beta \end{bmatrix} = \begin{bmatrix} v_{\alpha1} + v_{\alpha2} \\ v_{\beta1} + v_{\beta2} \end{bmatrix} - R \begin{bmatrix} i_{\alpha1} + i_{\alpha2} \\ i_{\beta1} + i_{\beta2} \end{bmatrix} - L\frac{d}{dt}\begin{bmatrix} i_{\alpha1} + i_{\alpha2} \\ i_{\beta1} + i_{\beta2} \end{bmatrix} \quad (6)$$

Here, R represents a resultant value of the winding resistances of the coils 221, 222, and L represents a resultant value of the inductances of the coils 221, 222. Note that d/dt represents a differential operation. The induced voltage computing unit 119 outputs the computed induced voltage vector E($e_\alpha$, $e_\beta$) to the rotation direction estimator 120 and the estimated electrical angle computing unit 121.

The estimated electrical angle computing unit 121 computes the magnitude |E| of the induced voltage vector E according to Expression (7), and computes the estimated electrical angle θeb of the motor according to Expression (8) using the computed magnitude |E| of the induced voltage vector E.

$$|E| = \sqrt{e_\alpha^2 + e_\beta^2} \quad (7)$$

$$\theta_{eb_n} = \theta_{eb_{n-1}} + d \cdot \frac{|E|}{K_e} \cdot T_s \quad (8)$$

The functional units of the electrical angle estimator 110 repeatedly execute the computation process with a prescribed short period. In this specification, the estimated electrical angle θeb computed at the present moment by the estimated electrical angle computing unit 121 will be denoted by "$\theta_{eb_n}$", and the estimated electrical angle θeb computed at m-th preceding computation timing will be denoted by "$\theta_{eb_{n-m}}$" such as an estimated electrical angle $\theta_{eb_{n-1}}$ computed at immediately preceding computation timing and an estimated electrical angle $\theta_{eb_{n-2}}$ computed at second preceding computation timing. In addition, d represents the estimated rotation direction of the motor 20, $K_e$ represents the motor induced voltage constant, and $T_s$ represents the computation period of the estimated electrical angle computing unit 121. The estimated rotation direction d is a rotation direction of the motor 20 estimated by the rotation direction estimator 120 (described later). The counterclockwise rotation direction is defined as a positive rotation direction in the present embodiment. Accordingly, the estimated rotation direction is set to 1 when it is estimated that the motor 20 rotates in the counterclockwise direction, and is set to −1 when it is estimated that the motor 20 rotates in the clockwise direction.

Figure 9:
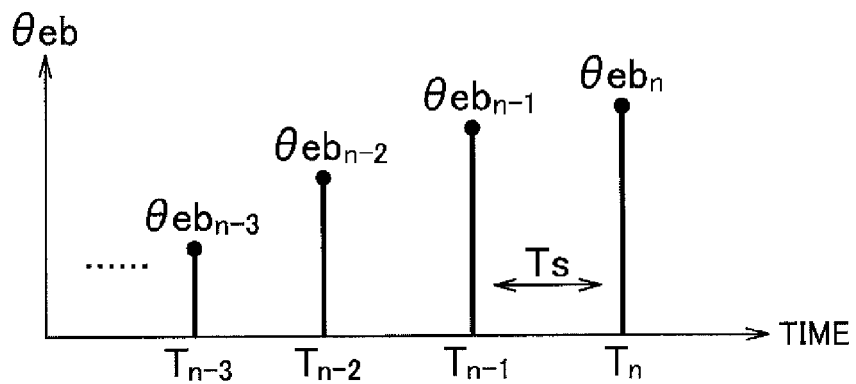
FIG. 9 is an explanatory view illustrating a method of computing an estimated electrical angle.

The magnitude of the induced voltage generated at the motor 20 and the motor angular velocity have a proportional relationship. The motor angular velocity is obtained by dividing the magnitude |E| of the induced voltage by the motor induced voltage constant $K_e$ [V/(rad/s)]. The second term of the right side of Expression (8) represents an electrical angle by which the motor 20 is rotated in one computation period $T_s$. Therefore, according to Expression (8), the estimated electrical angle $\theta_{eb_n}$ at the present moment is computed by adding an electrical angle, by which the motor 20 rotates from the immediately preceding computation timing to the present computation timing (in one computation period), in the estimated rotation direction of the motor 20, to the estimated electrical angle $\theta_{eb_{n-1}}$ computed at the immediately preceding computing timing. FIG. 9 illustrates an image how the estimated electrical angle θeb is varied by the computation.

The initial value of the estimated electrical angle $\theta_{eb_{n-1}}$ is set to a value immediately before the abnormality detector 107 detects an abnormality of the rotation angle sensor 18. The electrical angle estimator 110 receives the actual electrical angle θea output from the electrical angle detector 108 to update the stored actual electrical angle θea when an abnormality of the rotation angle sensor 18 is not detected. When the fact that the sensor abnormality determination signal $F_{fail}$ output from the abnormality detector 107 is switched to one, which indicates that there is an abnormality in the rotation angle sensor 18, the electrical angle detector 108 sets the actual electrical angle θea immediately before detecting the abnormality, as the estimated electrical angle $\theta_{eb_{n-1}}$, and starts computing the estimated electrical angle $\theta_{eb_n}$ according to Expression (8). After this, the estimated electrical angle $\theta_{eb_n}$, which is obtained through computation, is used as the estimated electrical angle $\theta_{eb_{n-1}}$ in Expression (8) in the next computation period. Therefore, the estimated electrical angle $\theta_{eb_n}$ is set as the estimated electrical angle $\theta_{eb_{n-1}}$ and the stored information is sequentially updated. The estimated electrical angle computing unit 121 sets the estimated electrical angle $\theta_{eb_n}$ as the estimated electrical angle θeb, and outputs the estimated electrical angle $\theta_{eb_n}$ to the electrical angle selector 109.

Figure 10:
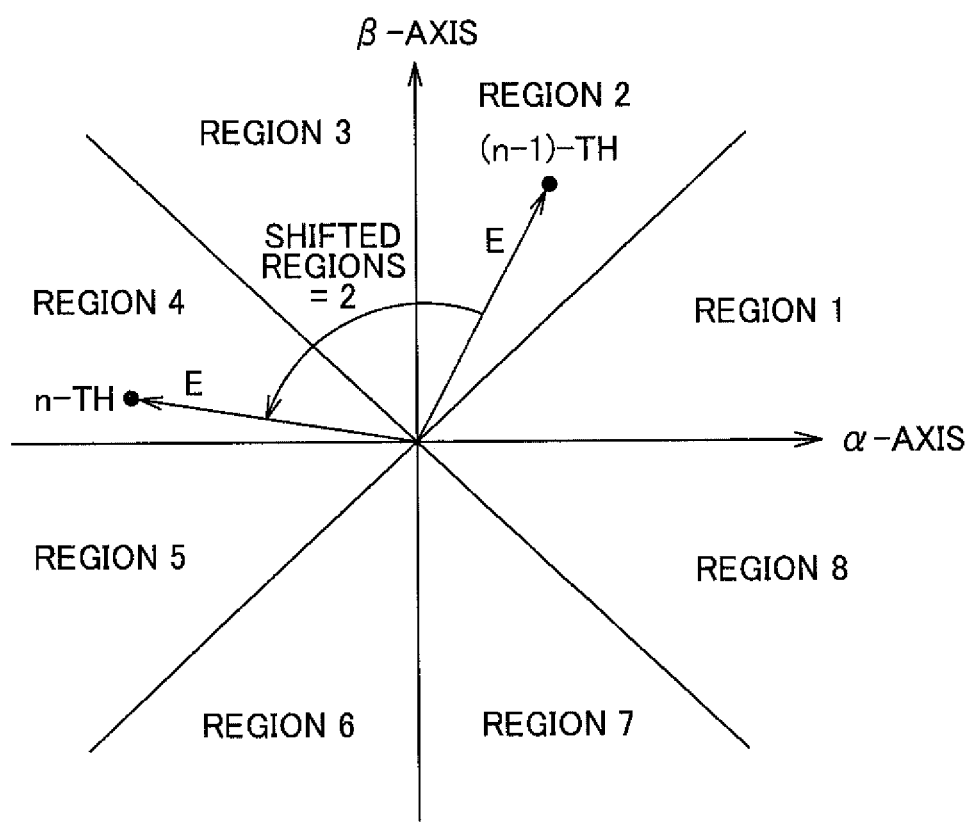
FIG. 10 is an explanatory view illustrating regions obtained by dividing the plane of the $\alpha$-$\beta$ coordinates.

The rotation direction estimator 120 is a functional unit that estimates the direction in which the motor 20 rotates, and estimates the direction in which the induced voltage vector E rotates in the time series (direction in which the direction of the vector moves). In the present embodiment, as illustrated in FIG. 10, an α-β coordinate plane is divided into N (N>3) regions in the rotation direction at equal angular intervals. In the example illustrated in FIG. 10, N is set to eight (N=8), that is, the α-β coordinate plane is divided into eight regions which are set to region 1 to region 8.

The rotation direction estimator 120 detects the region in which the coordinates ($e_\alpha$, $e_\beta$) of the induced voltage vector E received from the induced voltage computing unit 119 are present for each computation period, and stores information (for example, region number) for identifying the detected region. When it is determined that the coordinates ($e_\alpha$, $e_\beta$) of the induced voltage vector E shift from one region to another region based on the region detected in the immediately preceding computation period and the region detected at this timing, the rotation direction estimator 120 determines the rotation direction of the induced voltage vector E based on the number of shifted regions (hereinafter, referred to as "shifted region number Ka").

When the coordinates ($e_\alpha$, $e_\beta$) of the induced voltage vector E shift to an adjacent region, the shifted region number Ka is one (Ka=1). For example, in the example illustrated in FIG. 10, because the region stored in the immediately preceding computation period (temporal ordering is n−1) is region 2 and the region detected at this timing (temporal ordering is n) is region 4, the shifted region number Ka is two (Ka=2). The computation period of the rotation direction estimator 120 is set such that the shifted region number Ka does not exceed N/2 even when the motor 20 rotates at the highest rotation speed.

The rotation direction estimator 120 assumes (estimates) that the thus determined direction in which the induced voltage vector E rotates in time sequence is the same as the rotation direction of the motor 20, and outputs the information indicating the estimated rotation direction d, which is the above-described rotation direction, to the estimated electrical angle computing unit 121.

Figure 11:
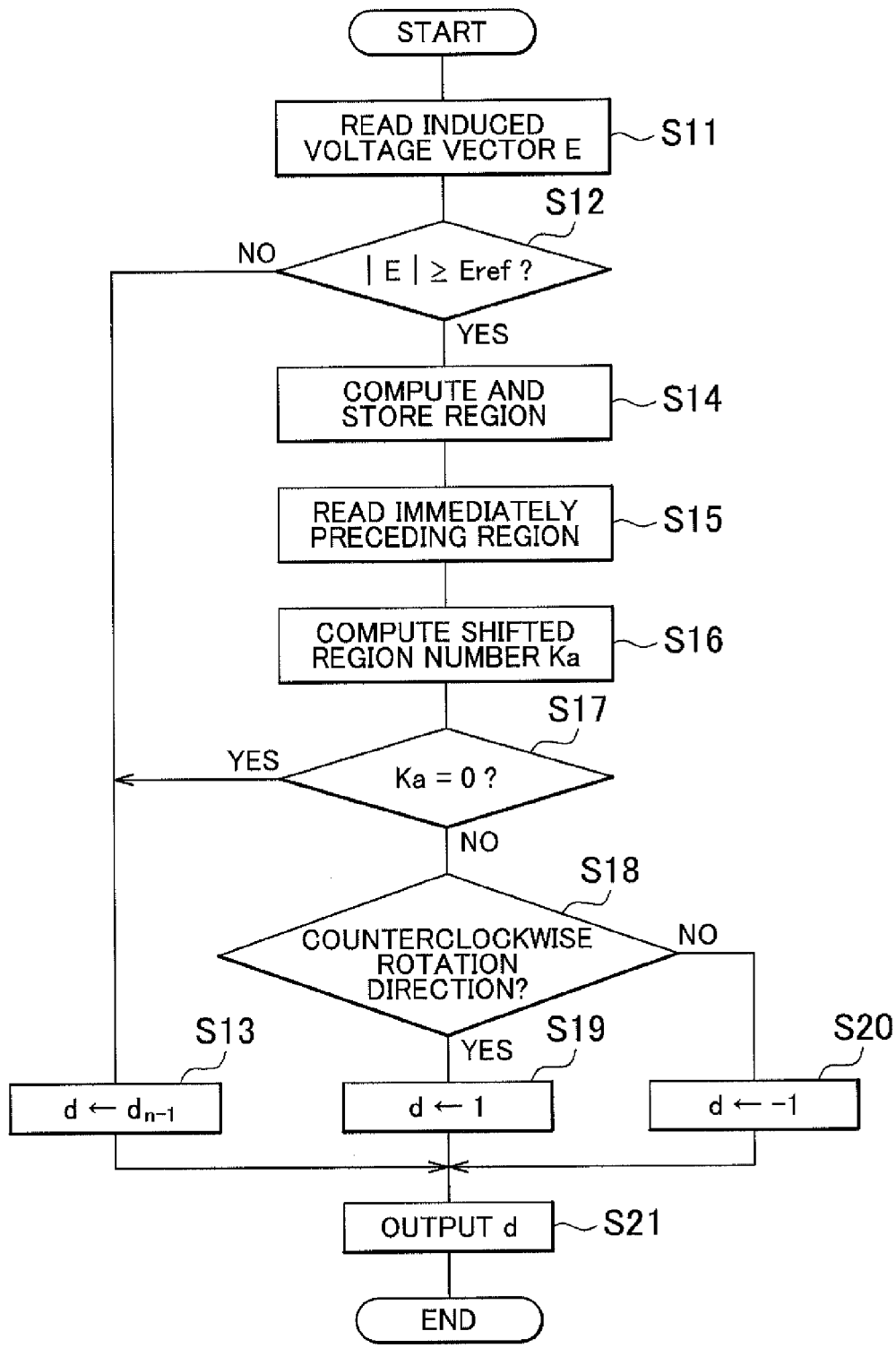
FIG. 11 is a flowchart illustrating a rotation direction estimation routine.

FIG. 11 illustrates a rotation direction estimating routine that is executed by the rotation direction estimator 120. The rotation direction estimating routine is repeatedly executed with a prescribed computation period. When this routine is started, the rotation direction estimator 120 reads the induced voltage vector E($e_\alpha$, $e_\beta$) output from the induced voltage computing unit 119 in step S11. Subsequently, in step S12, it is determined whether the magnitude |E| of the induced voltage vector E is equal to or greater than a prescribed reference value Eref. The magnitude |E| of the induced voltage vector E can be computed according to Expression (7). However, comparison with the reference value Eref is the purpose in this case. Therefore, if the square of the reference value Eref is obtained, only comparison with the sum of the square value of $e_\alpha$ and the square value of $e_\beta$ is required and computation of the square root may be omitted. As the magnitude |E| of the induced voltage vector E, a value computed by the estimated electrical angle computing unit 121 may be read.

When the rotation speed of the motor 20 is low, the influence of noise contained in a sensor value or a coil resistance error increases, and therefore the detection accuracy of the computed induced voltage vector E is low. Accordingly, the rotation direction estimator 120 is not able to appropriately estimate the rotation direction when the magnitude |E| of the induced voltage vector E is lower than the prescribed reference value Eref. In this case, the rotation direction estimator 120 sets the estimated rotation direction d of the motor 20 to the same direction as the direction $d_{n-1}$ set in the immediately preceding timing (immediately preceding computation period), in step S13.

On the other hand, when the magnitude |E| of the induced voltage vector E is equal to or greater than the reference value Eref (YES in S12), the rotation direction estimator 120 detects the region in which the induced voltage vector E lies based on the vector coordinates ($e_\alpha$, $e_\beta$) and stores the information (region number) indicating the detected region, in step S14. Subsequently, the region number stored at the immediately preceding timing (stored in step S14 in the immediately preceding computation period) is read in step S15. Subsequently, the shifted region number Ka, which is the number of regions through which the induced voltage vector E shifts in one computation period, is computed based on the region number detected at this timing and the region number detected in the immediately preceding timing, in step S16. When a negative determination is made in step S12 in the process in the immediately preceding computation period, the region number is not stored. Accordingly, in this case, the shifted region number Ka is set to zero (Ka=0).

Subsequently, the rotation direction estimator 120 determines whether the shifted region number Ka is zero in step S17. When the shifted region number Ka is zero (YES in S17), the rotation direction estimator 120 proceeds on to step S13 and the estimated rotation direction d of the motor 20 is set to the same direction as the direction $d_{n-1}$ set in the immediately preceding timing (immediately preceding computation period).

On the other hand, when the shifted region number Ka is not zero (NO in S17), it is determined in step S18 whether the shift direction of the region in which the induced voltage vector E lies is the counterclockwise rotation direction. Because the shifted region number Ka is a value that satisfies 1≤Ka<(N/2), the shift direction of the induced voltage vector E is determined based on a change of the region number from the immediately preceding timing to this timing. The estimated rotation direction d of the motor 20 is set to 1 in step S19 when it is determined that the shift direction of the region in which the induced voltage vector E lies is the counterclockwise rotation direction (YES in S18), and the estimated rotation direction d of the motor 20 is set to −1 in step S20 when the shift direction of the region in which the induced voltage vector E lies is the clockwise rotation direction (NO in S18).

When the estimated rotation direction d is set in step S13, S19, or S20, the rotation direction estimator 120 outputs information indicating the estimated rotation direction d to the estimated electrical angle computing unit 121 in step S21, and ends the routine. The above-described process flow is repeatedly executed with a prescribed computation period.

The estimated electrical angle computing unit 121 outputs the estimated electrical angle $\theta$eb computed as described above to the electrical angle selector 109 as described above. When the sensor abnormality determination signal $F_{fail}$ output from the abnormality detector 107 is zero, the electrical angle selector 109 sets the actual electrical angle $\theta$ea output from the electrical angle detector 108 as the electrical angle $\theta$e. On the other hand, when the sensor abnormality determination signal $F_{fail}$ output from the abnormality detector 107 is one, the electrical angle selector 109 sets the estimated electrical angle $\theta$eb output from the electrical angle estimator 110 as the electrical angle $\theta$e. The electrical angle $\theta$e set in this way is output to the two phase-three phase coordinate converters 1051, 1052 and the three phase-two phase coordinate converters 1041, 1042 and is used for coordinate conversion computation.

In the electric power steering system according to the present embodiment described above, because drive control of the motor 20 is executed with the use of the two drive systems, it is possible to drive the motor 20 using the second drive system even when the first drive system malfunctions. Further, even when the rotation angle sensor 18 that detects the motor rotation angle required for the drive control of the motor 20 malfunctions, it is possible to continue to drive the motor 20 by computing the estimated electrical angle $\theta$eb and using the computed estimated electrical angle $\theta$eb. Therefore, it is possible to improve the fail-safe capability.

The induced voltage generated at the motor 20 needs to be computed in order to compute the estimated electrical angle $\theta$eb. However, a differential operation is included in the computation of the voltage corresponding to a coil reactance L, and the differential operation places a high computational load on the microcomputer of the ECU 100. Particularly, when the motor 20 includes multiple sets of coils with different drive systems and the induced voltage is computed for each drive system, the computational load is multiplied by the number of drive systems. Accordingly, the required performance of the microcomputer is raised, which causes an increase in cost.

Therefore, in the present embodiment, the added voltage vector ($v_{\alpha 1}+v_{\alpha 2}$, $v_{\beta 1}+v_{\beta 2}$) obtained by adding the voltage vector ($v_{\alpha 1}$, $v_{\beta 1}$) of the first coil 221 expressed in the two-phase fixed coordinate system and the voltage vector ($v_{\alpha 2}$, $v_{\beta 2}$) of the second coil 222 expressed in the two-phase fixed coordinate system is computed. And the added current vector ($i_{\alpha 1}+i_{\alpha 2}$, $i_{\beta 1}+i_{\beta 2}$) obtained by adding the current vector ($i_{\alpha 1}$, $i_{\beta 1}$) of the first coil 221 expressed in the two-phase fixed coordinate system and the current vector ($i_{\alpha 2}$, $i_{\beta 2}$) of the second coil 222 expressed in the two-phase fixed coordinate system is computed. Then the induced voltage vector E is computed based on the added voltage vector ($v_{\alpha 1}+v_{\alpha 2}$, $v_{\beta 1}+v_{\beta 2}$) and the added current vector ($i_{\alpha 1}+i_{\alpha 2}$, $i_{\beta 1}+i_{\beta 2}$). Therefore, the computation of the voltage corresponding to the coil reactance L is carried out by executing a differential operation on the added current vector ($i_{\alpha 1}+i_{\alpha 2}$, $i_{\beta 1}+i_{\beta 2}$) as expressed by Expression (6). Accordingly, even when multiple drive systems are provided, the differential operation required for computation of the voltage corresponding to the coil reactance L is executed with only computation corresponding to one drive system. As a result, the performance of the microcomputer need not be raised, and therefore an increase in cost does not occur.

While the electric power steering system according to one embodiment of the invention has been described above, the invention is not limited to the above-described embodiment, and various modifications may be made to the above-described embodiment within the scope of the invention.

Figure 12:
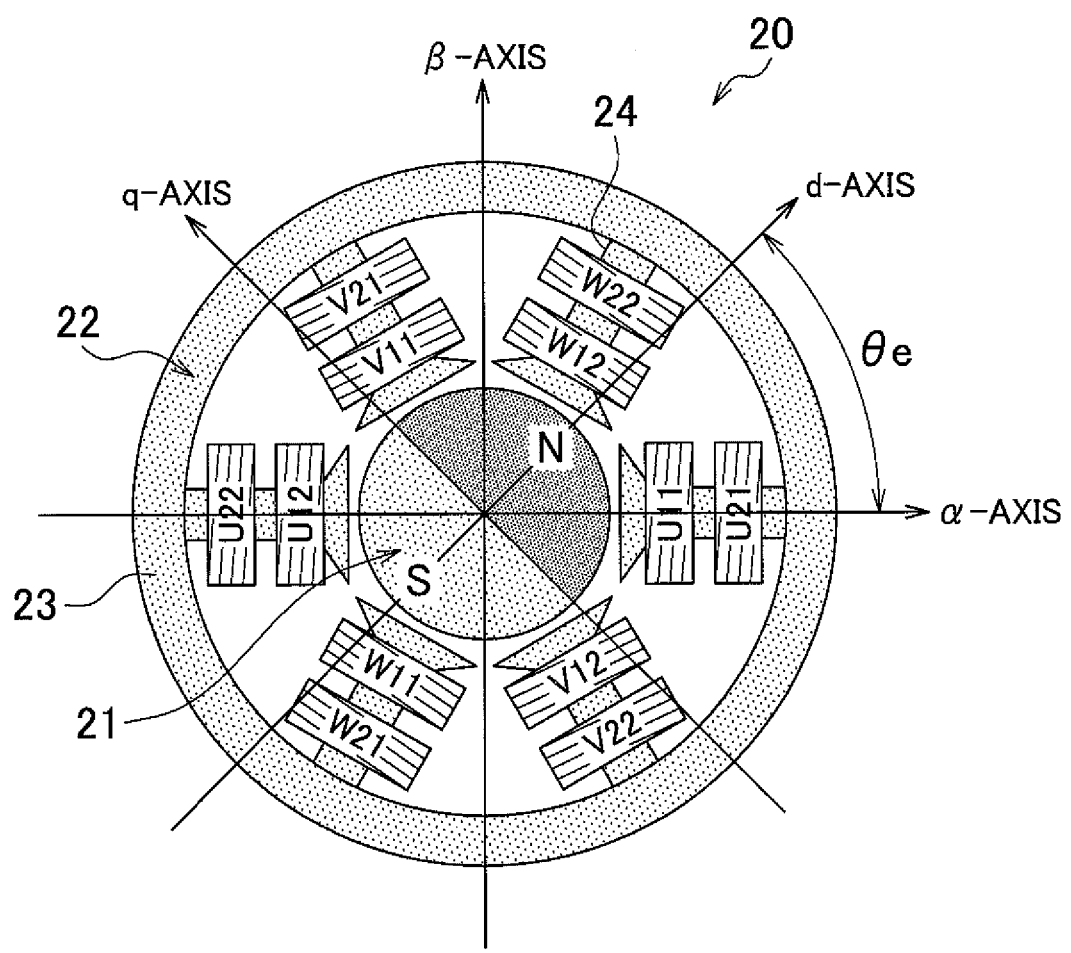
FIG. 12 is a sectional schematic view of a motor in another example, taken along a plane perpendicular to the axis of the motor shaf, and an explanatory view illustrating the arrangement of the three-phase coils of the motor, an $\alpha$-$\beta$ coordinate system (fixed coordinate system), and a d-q coordinate system (rotating coordinate system).

For example, in the above-described embodiment, the motor 20 has a configuration in which the two sets of coils, that is, the coils 221, 222 are arranged such that adjacent coils are offset from each other in the circumferential direction of the stator 22. Alternatively, the configuration in which the first coil 221 and the second coil 222 are wound around the same teeth 24, for example, as illustrated in FIG. 12. In this example, the coil U11 and the coil U21 are wound around the same tooth 24, the coil V11 and the coil V21 are wound around the same tooth 24, the coil W11 and the coil W21 are wound around the same tooth 24, the coil U12 and the coil U22 are wound around the same tooth 24, the coil V12 and the coil V22 are wound around the same tooth 24, and the coil W12 and the coil W22 are wound around the same tooth 24. In this case, the offset angles $\theta 1$, $\theta 2$ in Expressions (2) to (5) in the course of computing the induced voltage may be set to zero.

The above-described embodiment employs the configuration in which the motor 20 is driven by the two drive systems. However, the number of drive systems is not limited to two, and may be three or more. In this case, it is possible to suppress an increase in computational load on the microcomputer by adding together the voltage vectors of which the number is equal to the number of drive systems and adding together the current vectors of which the number is equal to the number of drive systems and then computing the induced voltage of the motor 20.

The above-described embodiment employs the configuration in which the estimated electrical angle $\theta eb$ is computed by computing the estimated angular velocity of the motor 20 based on the magnitude of the induced voltage, computing the amount of rotation in one computation period of the motor 20 at the estimated angular velocity as an electrical angle variation, and adding the electrical angle variation, in the motor rotation direction, to the estimated electrical angle in the immediately preceding computation period. Alternatively, the estimated electrical angle $\theta eb$ may be computed directly based on the angle formed between the induced voltage vector E and the $\alpha$-axis in the $\alpha$-$\beta$ coordinate system. In this case, the angle formed between the induced voltage vector E and the $\alpha$-axis in the $\alpha$-$\beta$ coordinate system is obtained by computing an arc tangent of $e_\beta/e_\alpha$, that is, $\tan^{-1}(e_\beta/e_\alpha)$. The direction of the induced voltage vector E, that is, the direction in which the induced voltage is generated, is the q-axis direction, and the electrical angle $\theta e$ of the motor 20 is an angle formed between the d-axis and the $\alpha$-axis penetrating through the U-phase coils of the motor 20. Therefore, the estimated electrical angle $\theta eb$ is computed by retarding the angle of the induced voltage vector E by 90°.

In the above-described embodiment, the square root of the square sum of the induced voltage components ($e\alpha$, $e\beta$) in the $\alpha$-$\beta$ coordinate system is computed in order to compute the absolute value of the induced voltage. Alternatively, the induced voltage may be converted into another coordinate system (for example, a so-called $\gamma$-$\delta$ coordinate system that is a d-q coordinate system in which the estimated electrical angle estimated at this time point is used as the reference) and then the absolute value thereof may be computed.

In the above-described embodiment, the rotation direction of the induced voltage vector E is regarded as the rotation direction of the motor 20 when the estimated electrical angle $\theta eb$ is computed. Alternatively, for example, the direction in which the steering torque Tr detected by the torque sensor 17 is applied may be regarded as the rotation direction of the motor 20. Further alternatively, for example, a configuration may be employed in which a yaw rate sensor that detects a yaw rate of a vehicle body or a lateral acceleration sensor that detects a lateral acceleration (the direction to the right or the direction to the left) is provided and the rotation direction of the motor 20 is estimated based on the direction of the yaw rate or the lateral acceleration output from such a sensor.

The above-described embodiment employs a configuration in which the rotation angle sensor 18 is provided and the drive circuit is controlled based on the actual electrical angle of the motor 20 detected by the rotation angle sensor 18 when an abnormality of the rotation angle sensor 18 is not detected. Alternatively, there may be employed a configuration in which the rotation angle sensor 18 is not provided, the estimated electrical angle is constantly computed, and the drive circuit is controlled based on the estimated electrical angle.

In the above-described embodiment, a rack assist-type electric power steering system that applies torque generated by the motor 20 to the rack bar 14 has been described. Alternatively, the invention may be applied to a column assist-type electric power steering system that applies the torque generated by the motor to the steering shaft 12.

What is claimed is:

1. An electric power steering system comprising:
   a permanent magnet synchronous motor disposed in a steering mechanism to generate steering assist torque, and including a motor stator provided with multiple sets of three-phase coils with different drive systems;
   a motor drive unit that includes drive circuits provided so as to respectively correspond to the multiple sets of three-phase coils, and that energizes the multiple sets of three-phase coils independently through the respective drive circuits to drive the permanent magnet synchronous motor;
   an electrical angle estimator that computes an estimated electrical angle of the permanent magnet synchronous motor; and
   a motor control unit that controls the drive circuits of the motor drive unit based on the estimated electrical angle computed by the electrical angle estimator to drive the permanent magnet synchronous motor,
   wherein the electrical angle estimator includes
      multiple three phase-two phase voltage vector converters each of which converts a voltage vector of voltages supplied to the three-phase coils, the voltage vector being expressed in a three-phase fixed coordinate system, into a voltage vector expressed in a two-phase fixed coordinate system, and which are provided respectively for the multiple sets of three-phase coils,
      multiple three phase-two phase current vector converters each of which converts a current vector of currents passed through the three-phase coils, the current vector being expressed in a three-phase fixed coordinate system, into a current vector expressed in a two-phase fixed coordinate system, and which are provided respectively for the multiple sets of three-phase coils, multiple voltage vector adders each of which adds together the voltage vectors of the multiple sets of three-phase coils, the voltage vectors being expressed in the two-phase fixed coordinate system, multiple current vector adders each of which adds together the current vectors of the multiple sets of three phase coils, the voltage vectors being expressed in the two-phase fixed coordinate system, and an induced voltage computing unit that computes an induced voltage generated at the permanent magnet synchronous motor based on an added voltage vector computed by the voltage vector adders and an added current vector computed by the current vector adders, wherein the electrical angle estimator estimates an electrical angle of the permanent magnet synchronous motor based on the computed induced voltage.

2. An electric power steering system according to claim 1, wherein, the motor includes a motor stator provided with two sets of three-phase coils with different drive systems.

3. An electric power steering system according to claim 1, further comprising:
a estimated electrical angle computing unit that computes an estimated electrical angle of the motor by computing an arc tangent of the induced voltage vector.

4. An electric power steering system according to claim 1, further comprising:
a rotation direction estimator that estimates the direction in which the motor rotates.

5. An electric power steering system according to claim 4, wherein, the rotation direction estimator estimates the direction of the motor rotation from the direction of a steering torque detected by a torque sensor.

6. An electric power steering system according to claim 4, further comprising:
a yaw rate sensor that detects a yaw rate of a vehicle body, wherein, the rotation direction estimator estimates the direction of the motor rotation from the direction of the yaw rate detected by the yaw rate sensor.

7. An electric power steering system according to claim 4, further comprising:
a lateral acceleration sensor that detects a lateral acceleration of a vehicle body, wherein, the rotation direction estimator estimates the direction of the motor rotation from the direction of the lateral acceleration detected by the lateral acceleration sensor.

* * * * *